Nov. 25, 1969   N. M. KRAMAROW   3,479,697
PIN-TYPE CONNECTING JOINT AND METHOD OF ASSEMBLING
Filed June 13, 1967   2 Sheets-Sheet 1
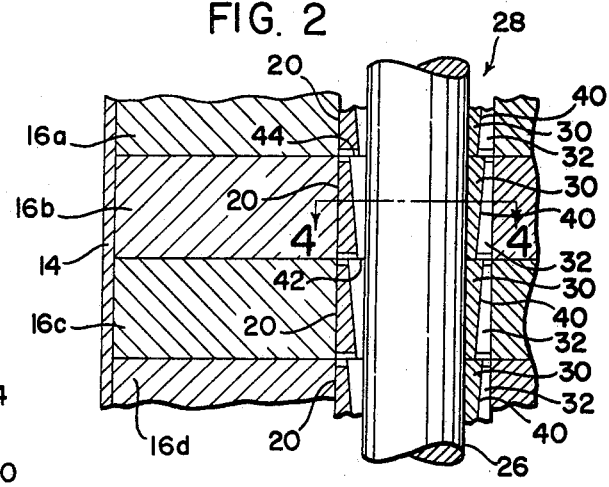
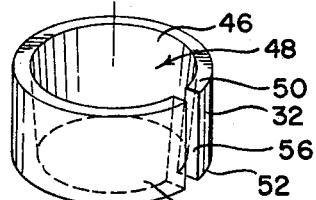
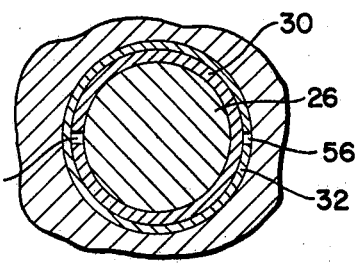
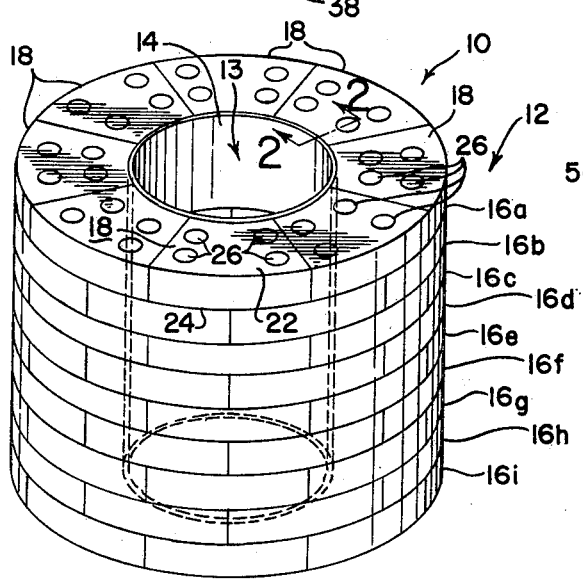
INVENTOR.
NATHAN M. KRAMAROW
BY
Meyer, Tilberry & Body
ATTORNEYS

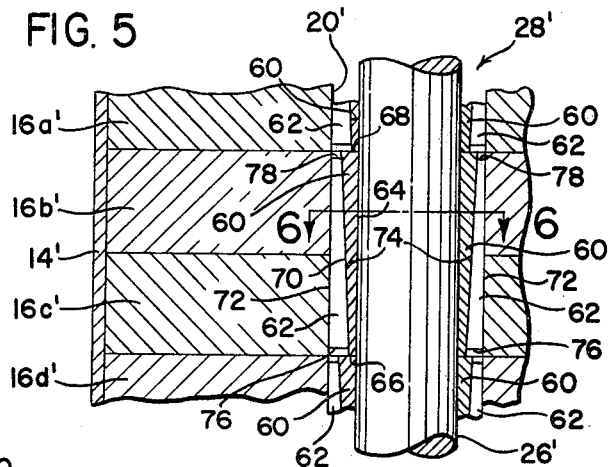
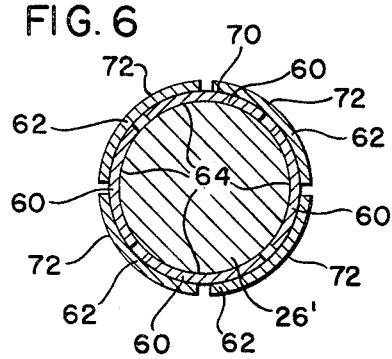
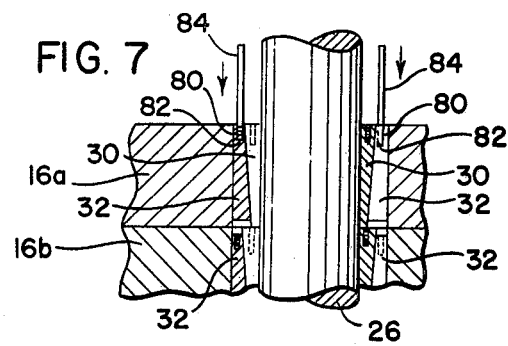
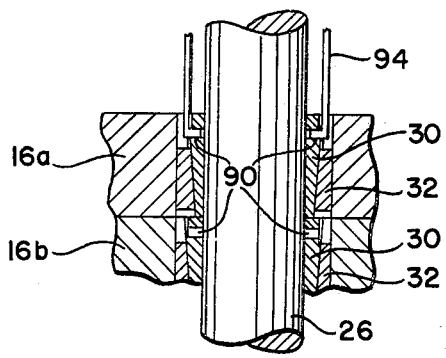
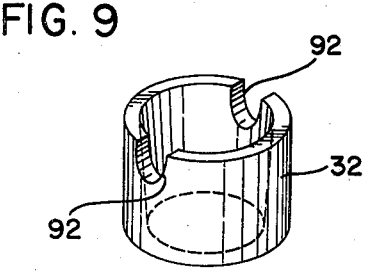

United States Patent Office 3,479,697
Patented Nov. 25, 1969

3,479,697
PIN-TYPE CONNECTING JOINT AND METHOD
OF ASSEMBLING
Nathan M. Kramarow, Flushing, N.Y., assignor to Barogenics, Inc., Mount Vernon, N.Y., a corporation of New York
Filed June 13, 1967, Ser. No. 645,672
Int. Cl. B29c 1/00
U.S. Cl. 18—34                         5 Claims

ABSTRACT OF THE DISCLOSURE

A hinge pin-type joint and method of assembling the same which is extremely advantageous for constructing pressure containers of the segmented cylinder type. The joint structure includes a plurality of overlapped structural bodies having generally aligned bores extending therethrough. A pin, having a longitudinal axis and a cylindrical outer surface of a diameter materially less than the minimum transverse width of the bores, is positioned within the bores so as to define, in conjunction therewith, an axially extending clearance passage having openings at its opposite ends. A connecting member is forced into the passage from one of the openings. This connecting member has an inner end and an outer end, and a connecting body portion between the ends. The body portion is of a gradually decreasing cross section from the outer end to the inner end. Consequently, when the member is forced into the openings it is compressed between the outer surface of the pin and the bore to form a force transmitting connection therebetween.

---

The present invention is directed toward the art of pin-connected structures and, more particularly, to an improved pin connected type structure and method of assembling the same.

The invention is particularly advantageous for use in constructing large pin-connected segmented type pressure containers and will be described with reference thereto; however, it is appreciated the invention is capable of broader application and could be utilized in constructing a variety of pin-connected type structures.

Recently there has been developed a pressure container which allows construction of extremely large pressure containers capable of withstanding ultrahigh pressures. Basically, as discussed in United States Patent 3,278,993 to Brayman et al., the concept of this new construction is the provision of two separation structures for separately performing the two main functions of a pressure vessel i.e. provided one structure for containing the fluid without leaks, and a second structure to resist the tremendous forces generated by the pressurized fluid.

Preferably, the first structure comprises a thin walled liner tube or cylinder; while, the second structure comprises a support cylinder closely surrounding the liner tube and formed from a plurality of discrete ring sectors interconnected in a manner which renders the support cylinder as a whole transmissive of hoop tension without Lamé effect.

Although the Brayman et al. patent discloses several specific embodiments for the support cylinder, the preferred embodiments interconnect the ring sectors by axially extending shear pins passing through aligned openings in the ring sectors. As is apparent, the proper construction and functining of this type of cylinder is, in large part, dependent on proper fit between each segment and the pins so that a continuous cylinder is formed by the pin-sector assembly.

The smaller size cylinders (e.g., 1″ to 2″ internal bore, approximately 1″ diameter pins, and a total cylinder length of approximately 12″) can be successfully constructed and assembled with accurate machining and assembly techniques such as:

(a) Jig drilling of the sectors to assure correct pin center-to-center spacing;

(b) Preliminary undersize drilling followed by final line reaming of the sector assembly to assure accurate pin-to-sector contact; and (c) Lightly pressing the pin into a stacked sector assembly to provide proper contact between the sectors and pins.

An additional technique utilized to assure proper contact between the pin and the sector holes or other reactive openings is disclosed in United States Patent 2,968,837 to Zeitlin et al. As shown in FIGURE 6 of this patent, a tapered pin in contact with a thin slotted sleeve having an internal bore tapered to the same dimensions as the pin is fitted into the aligned holes of the stacked sector assembly. The external diameter of the sleeve is cylindrical to engage the sector holes. By applying axial pressure to the pin the sleeve is expanded causing its external diameter to move radially outward to assure proper engagement betwen the pin and the sectors.

Although the two above-described techniques are satisfactory for the small size cylinders, when large size cylinders are being constructed certain problems arise. First, the accumulation of normal manufacturing tolerances on large components does not permit accurate pin-to-pin center line distances to be maintained. Secondly, it is extremely difficult to drive a straight pin to fully engage over a multisector assembly of any substantial length or diameter. And, thirdly, even the use of the tapered pin and sleeve technique is not practicable beyond a length of about 4 feet because the axial force required to generate the required sleeve movement becomes excessive and even a slight taper requires a large diameter sleeve.

The present invention provides a pin point construction and method of assembling the same which overcomes the above-described problems and permits ready fabrication of large size pin-connected segmented cylinders and similar devices. The invention is especially useful in instances where it is difficult to maintain axiality of the pin receiving holes in multiple layer pin connected joints.

In accordance with one aspect of the present invention there is provided an improved hinge pin-type joint. This joint includes a plurality of overlapped structural bodies having generally aligned bores extending therethrough. A pin, having a longitudinal axis and a cylindrical outer surface of a diameter materially less than the minimum transverse width of the bores, is positioned within the bores so as to define, in conjunction therewith, an axially extending clearance passage having openings at its opposite ends. A connecting member is forced into the passage from one of the openings. This connecting member has an inner end and an outer end, and a connecting body portion between the ends. The body portion is of a gradually decreasing cross section from the outer end to the inner end. Consequently, when the member is forced into the openings it is compressed betwen the outer surface of the pin and the bore to form a force transmitting connection therebetween.

In this manner, the problems previously encountered with nonalignment of the bores and the lack of proper contact between the pin and the bores is overcome. As is apparent, the bores can be made uniformly oversize and the slack between the bores and the pin taken up by the connecting member.

In accordance with another aspect of the present invention there is provided an improved method of forming a hinge pin-type joint. The method comprises the steps of providing at least first and second structural bodies having opposed outwardly facing surfaces; forming at least one bore in each of the bodies extending between the opposed surfaces; providing an elongated shear pin having a longitudinal axis and a circular cross-section of a diameter less than the minimum transverse width of the bores; positioning the pin longitudinally through the bore of at least one of the structural bodies so as to define an axially extending clearance passage having openings at its opposite ends; providing a connecting member having an inner end and an outer end and a connecting body portion between said ends which has a gradually decreasing cross-section from the outer end to the inner end; inserting the inner end of the member into the passage from one of the openings; and, applying sufficient force to the member to move it into the clearance passage and compress it between the outer surface of the pin and the bore to form a force transmitting connection between the pin and the bore.

Accordingly, a primary object of the present invention is the provision of a hinge pin type joint construction and method of forming same which overcomes the problems of nonalignment of the connected members and the lack of proper contact between the pin and the pin receiving bores.

An additional object of the present invention is the provision of an improved pressure container of the segmented cylinder type which overcomes construction problems previously encountered in the construction of such containers.

Another object of the present invention is the provision of a pin type connecting joint which is provided with means which allow for some misalignment between the bores of the members being connected.

A still further object of the present invention is the provision of an improved pressure container structure of the segmented cylinder type which eliminates the necessity of holding extremely close tolerances during the manufacture of the various component parts.

Yet another object of the present invention is the provision of a method of forming hinge pin-type joints which is especially advantageous in constructing especially large size pressure containers of the segmented cylinder type.

These and other objects and advantages will become apparent from the following description when read in conjunction with the accompanying drawings wherein:

FIGURE 1 is a pictorial view of a segmented pressure container formed in accordance with the present invention;

FIGURE 2 is a cross-sectional view taken on line 2—2 of FIGURE 1;

FIGURE 3 is a pictorial view showing one form of connecting members utilized in the present invention;

FIGURE 4 is a cross-sectional view taken on line 4—4 of FIGURE 2;

FIGURE 5 is a cross-sectional view similar to FIGURE 2 and showing a modified form of connecting members used in the present invention;

FIGURE 6 is a cross-sectional view taken on line 6—6 of FIGURE 5;

FIGURE 7 is a cross-sectional view similar to FIGURE 4 and showing a method of disassembling a hinge pin-type joint formed in accordance with the present invention;

FIGURE 8 is a cross-sectional view similar to FIGURE 2 showing another method of disassembling a hinge pin-type joint formed in accordance with the present invention; and, FIGURE 9 is a pictorial view of a modified form of connecting member utilized in the modification shown in FIGURE 8.

Referring now to the drawings wherein the showings are for the purpose of illustrating embodiments of the invention only and not for the purpose of limiting same, FIGURE 1 shows the overall arrangement of a segmented pressure container 10 formed in accordance with one aspect of the present invention.

Broadly, as shown, the container comprises an outer segmented support cylinder 12 which functions to withstand the radial pressure forces developed within its longitudinally extending bore 13. Positioned within the bore 13, and closely in engagement with the walls thereof, is a fluid impervious thin-walled liner tube 14. Tube 14 functions to sealingly retain the fluid within the bore 13.

The outer support cylinder 12 could be of a variety of specific constructions, such as shown in United States Patent No. 3,278,993, issued Oct. 18, 1966, to Brayman et al. As discussed more fully in that patent, the basic consideration is that the support cylinder 12 be comprised to discrete ring sectors joined together to form a complete cylinder with the sectors connected together in a manner which renders the cylinder transmissive of hoop tension without Lamé effect.

Although a variety of different constructions produce the desired characteristics, the preferred construction is as shown in FIGURE 1. As shown there, the support cylinder 12 comprises a plurality of axially superposed ring layers 16a through 16i each formed from a plurality of structural bodies in the form of discrete metallic ring sectors 18. The sectors 18 in each of the respective rings 16a through 16i are identical with the other sectors of the same ring and are provided with four openings or bores 20 which extend vertically through the sector and perpendicular to its upper and lower surfaces 22 and 24, respectively. These openings function to provide means for permitting interconnection of the individual sectors to form a complete cylinder which is transmissive of hoop tension without Lamé effect.

As shown, the sectors which make up each ring are rotated relative to those of the next adjacent ring by an angle equivalent to that subtended by about half the arcuate extent of one sector. This rotation produces between the sectors an interleaved or lapping relation wherein the two arcuate half portions of each ring sector are lapped fully, or almost fully, with an arcuate half portion of the adjacent sector of the next adjacent ring. Additionally, the bore openings of each of the overlapped or interleaved sectors are then in general alignment. This permits elongated generally cylindrical, axially extending shear pins 26 to be positioned within each series of aligned bores to tie the ring sectors into a complete cylinder. Although, preferably, the pins pass through the entire length of the cylinder, as discussed in United States Patent No. 3,278,993 each of the pins can be subdivided into shorter length pins each of which pass through a limited number of ring sectors.

In order to axially clamp the rings together to permit the support cylinder to resist axially directed loads, nuts, not shown, are threaded onto the outer ends of pins 26. Alternately, the entire cylinder can be axially clamped by end plates connected by bolts in the manner shown in FIGURE 7 of the aforementioned patent.

This general form of construction provides a pressure container which is extremely advantageous for a variety of reasons. For example, since the structure is not subject to Lamé stress concentration the wall thickness and outside diameter of the container can be substantially less than with prior constructions. Further, the construction permits formation of containers of large sizes capable of withstanding pressures of extremely high magnitude (e.g., 400,000 p.s.i. and higher).

As previously discussed, in order to obtain proper fit between the axially extending shear pins and the bores 20 of the ring sectors, as well as, to provide proper fit between the various ring sectors, it has been the practice to machine each of the individual sectors to extremely close tolerances. This increased the cost of the structure and additionally, even with the use of such techniques it was often difficult, especially in the exteremely large size containers, to prevent the combined effect of many small tolerance variations from causing improper fit between the shear pins and the bores of the sectors.

The present invention overcomes these construction problems by providing an improved construction for the joint connection between the shear pins and the individual ring sectors.

The preferred construction for this joint connection is as shown in FIGURES 2 and 4. As shown, according to this construction, each of the bores 20 is formed so that its minimum transverse width is substantially greater than the diameter of the shear pins 26. This provides an axially extending clearance passage 28 between the outer surface of the respective shear pin and the inner surface of the bore 20. In the preferred embodiment, with the bores of cylindrical shape and the pin of circular cross-section, clearance passage 28 will be of generally annular configuration.

In order to provide a force transmitting connection between the walls of the bores and the outer surface of the shear pin, connecting members in the form of generally cylindrical tubular sleeve-like members are positioned in the clearance passageway 28 intermediate the outer surface of the pin 26 and the inner wall of bore 20.

As best shown in FIGURE 3 the connecting members preferably comprise a pair of generally cylindrical tubular sleeve-like members 30 and 32. Member 30 is formed so as to have a central cylindrical bore 34 of a diameter so that its inner wall 36 closely receives the outer surface of pin member 26. Member 32 is formed so as to have an outer surface 38 which is of a size and configuration to be closely received in bore 20. It is to be understood that although member 32 is shown as having a circular outer configuration, this configuration is dictated solely by the configuration of the inner walls or wall of bores 20. Accordingly, should bore 20 be made of a noncircular configuration the outer surface of member 32 would be similarly configured.

The outer surface 40 of member 30 is tapered axially of the member from the member's inner end 42 to its outer end 44. The inner wall 46 of bore 48 of member 32 is similarly tapered from the inner end 50 to the outer ends 52. Consequently, the body portions of both members 30 and 32 are of gradually decreasing cross-section from their respective inner ends 42 and 50 to their respective outer ends 44 and 52. However, when member 30 is fitted within bore 48 of member 32 the resulting composite structure has a uniform annular cross-section. In this manner, when the members 30 and 32 are positioned in the clearance passageway 28 they substantially completely fill the passageway. Additionally, by applying an axially directed force to the outer ends of either one or both of the members 30 and 32 the members are caused to be compressed between the outer surface of the pin 26 and the inner wall of the respective bore 20. This provides a tight force transmitting connection between the pin and the sector and eliminates the necessity of holding the size and position of the bore and the size or diameter of the pin to extremely close tolerances to assure the proper fit.

In order to facilitate the necessary expansion and/or contraction of the members they are both provided with longitudinally extending expansion slots 54 and 56, respectively. Additionally, at least one of the members 30 or 32 is of a length less than the distance between the upper and lower surfaces of the respective sector 16. This allows the axial position of at least one of the members to be varied so as to permit the effective thickness of the assembly to be varied to completely fill clearance passageway 28 and apply the necessary connecting forces to the outer surface of pin 26 and the inner wall of the respective bore. As best shown in FIGURE 2, the axial length of the members 30 is preferably exactly equal to the thickness of the respective sector. Consequently, the entire length of pin passing through each sector is completely in engagement with the inner wall 36 of member 30. This is advantageous since the bearing stress on the pin is not increased beyond that present in the usual pin joint and, additionally, no bending is introduced which would increase the shear stress of the pin.

In constructing a segmented pressure container utilizing the proved structure of the present invention the procedure is preferably as follows:

First, all of the required shear pins 26 are positioned and arranged so as to have the relationship shown in FIGURE 1 and are mounted so that at least one of each of the pins is free of any supporting structure. This first step can be accomplished in a variety of ways, such as by mounting the lower end of each of the pins in a support member which allows the entire length of the pins extending thereabove to be free of any other structure.

Secondly, with the pins mounted in the required arrangement, the first layer of ring sectors 16i are slid into position from the upper end of the pins, and, generally centered relative their respective pins.

Thirdly, one of the members 32 is slid down each pin and positioned in the respective bore 20 surrounding that pin. Following this, a member 30 is slid down around each of the pins and its inner end 42 is inserted in the respective clearance passage 28.

Fourthly, axially directed forces are applied to the connecting members to drive them inwardly of the clearance passage causing each of the pair of members to engage their respective pin and bore to provide a tight fit therebetween and produce a force transmitting joint. The manner in which the forces are applied is not important and any conventional press or jack type structure could be utilized.

When all of the connecting members in the first ring layer have been properly positioned and the desired degree of engagement effected between the pins 26 and their respective ring sectors, a second layer of ring sectors is moved into position and the above sequence repeated. In this manner the support cylinder 12 is built to its desired height and the sectors properly engaged at each level with the longitudinally extending shear pins.

Although, the above described arrangement is preferred, a second modification of the connecting arrangement is shown in FIGURES 5 and 6. FIGURE 5 is a vertical section through a connection in the same manner as FIGURE 2. All elements appearing in the FIGURE 5 structure which are identical to those shown and described with reference to FIGURE 2 are given the same reference numerals and differentiated from the FIGURE 2 elements by the addition of a prime suffix. Accordingly a description of the FIGURE 2 elements having the same number is to be assumed applicable to the FIGURE 5 element unless otherwise noted.

According to the FIGURE 5 modification the connecting means positioned in the clearance passageways 28 comprise a plurality of first connecting members 60 and a plurality of second connecting members 62. Each of the connecting members has an arcuate inner surface 64 having a radius of curvature substantially equal to the radius of the pin member 26'. Surface 64 extends longitudinally between an inner end 66 and an outer end 68 and has an arcuate extent of slightly less than 90°. The outer surface 70 of each of the members 60 tapers so as to define a body having a constantly decreasing cross-section from the outer to the inner end.

The members 62 have a configuration generally similar to that described with reference to members 62. However, the outer surfaces 72 of the members are arranged to have a configuration substantially identical to the configuration of the bores 20', while the inner surface 70 is tapered from the outer end 76 to the inner end 78.

Although, as shown in FIGURE 5, the connecting members 60 and 62 are of a length sufficient to extend through the bores 20' of two of the arcuate ring sectors, it is apparent that the connecting members could be formed so as to extend over several sectors or to extend adjacent only one of the sectors as described with regard to the FIGURES 1 through 4 modification. the only drawback to having the sectors of substantial length is that correspondingly higher forces are required to properly position the members and assure the required connecting and prestressing forces between the pin and the ring sectors.

The method of assembling the joint of the FIGURE 5 modification is preferably generally the same as that described with reference to FIGURES 1–4. As is apparent from FIGURE 6, in assembling this joint four members 62 are positioned with their inner ends extending into the clearance passageway 68 and circumferentially spaced therein. Subsequently, four members 62 are moved into position between the outer surface of the pin 26' and the inner surface 74 of members 62. The required axial forces would then be exerted on the outer ends 66 of members 60 to drive them into their final position and create the desired prestressing forces on the joint and assure the proper fit between the pin and the sectors.

One of the advantages of the FIGURE 5 modification as compared to the modification of FIGURES 1 through 4 is that it can more readily compensate for nonalignment of the pin 26' with the bores 20 (i.e., the clearance space 28' defined by the outer surface of the pin and the inner wall of the bores 20' being of nonuniform axial width circumferentially of the pin). Note that by simply varying the longitudinal position of certain of the members 72 the effective thickness of the composite connecting assembly can be varied circumferentially of the pin. This ability to compensate for nonalignment of the pins and bores can also be achieved with the FIGURE 1 through 4 modification. For example, referring to FIGURE 3, it can be seen that if the axis of the bore 34 of member 30 is shifted transversely of the axis of the outer surface 40 (i.e., the two axes are parallel but spaced a slight amount) and the axis of bore 48 of member 32 shifted a corresponding amount relative the axis of outer surface 38, when the members are fitted together and rotated relative one another the position of bore 34 can be varied from the exact center of the composite structure to a point equal to twice of the offset of the axes. In this manner a substantial amount of nonaxiality of pin and bore can be compensated for.

Although two specific modifications of the hinge pin joint of the present invention have been described, it is apparent that a variety of other modifications could be utilized. For example, the inner connecting member could be of the type utilized in the FIGURE 1–4 modification while the outer connecting members could be as shown in the FIGURES 5 and 6 modifications. Further, it is apparent that members 60 and 64 of the FIGURES 5 and 6 modification could be subdivided still further so that more than four such members are utilized. Also, it is apparent that in any one structure both types of joints could be utilized.

FIGURES 7 and 8 show two methods which can be utilized to disassemble the hinge pin type joint of the present invention. Although the methods are shown with specific reference to the FIGURES 1 through 4 embodiment it will be apparent that they could equally well be used with the FIGURES 5 and 6 embodiment. As shown in FIGURE 7, the inner end of connecting member 32 is provided with threaded openings 80. Small diameter pins 82 having threaded lower ends 84 are then fitted into the openings 80 and axially directed forces applied to the pins to move the members 32 downwardly to unseat them from their position between the walls of the bore 20 and the outer wall of member 30. Member 30 can then be simply slid up pin 26 and removed from the upper end. Following this, member 32 and the corresponding ring sector can likewise be removed. Alternately, it is possible to provide threaded openings in the outer ends of members 30 and apply an axially outwardly directed force such as by the use of a wheel puller or other mechanism to unseat member 30 from its position between the outer surface of the pin and the inner surface of member 32. Simply by repeating the above process for each layer of ring sectors the entire pressure container can be readily disassembled.

FIGURE 8 shows a generally similar method for disassembling the joint. In this method the members 30 are provided with a plurality of transversely extending openings 90 adjacent their outer ends. The connecting members 32 are provided with U-shaped openings 92 which extend inwardly of the body of the member from the inner end, as best shown in FIGURE 9. During assembly the members 30 and 32 are positioned so that openings 90 are generally aligned with openings 92. Consequently, when it is desired to disassemble the structure, lifting hooks 94 can be engaged with openings 90 and an axially directed force applied to move members 30 vertically upward and out of engagement with the inner surface of members 32. The connecting members and the arcuate sector can then be simply removed from the upper ends of the pin 26. By repeating the process the entire container can be disassembled layer by layer.

Obviously the methods of FIGURES 7 or 8 can be applied with equal facility to the FIGURES 5 and 6 modification. All that is necessary is that the openings be provided in the ends of the members 60 and 62 the disassembly technique can be used.

The invention has been described in great detail sufficient to enable one of ordinary skill in the container art to make and use the same. Obviously modifications and alterations of the preferred embodiment will occur to others upon a reading and understanding of the specification and it is my intention to include all such modifications and alterations as part of my invention insofar as they come within the scope of the appended claims.

Having thus described my invention, I claim:

1. In a pressure container comprising a plurality of axially superposed ring layers each comprised of a ring of discrete metal ring sectors having portions in lapping relation with portions or ring sectors in other layers, said layers of ring sectors fitting together to form a hollow cylindrical shell; and, a plurality of axial shear pins of circular cross-section each of which passes through generally aligned bores in at least three of said lapping portions to interconnect said ring sectors to render said shell transmissive of hoop tension without Lamé effect, the improvement comprising: the diameter of each of said shear pins being materially less than the minimum transverse width of the bores through which it passes and, in conjunction therewith defining an axially extending clearance passage having openings at its opposite ends; and, at least a first connecting member forced into each of the passages from one of said openings, said connecting members each having a body portion terminating in an outer end and an inner end, said body portion having a gradually decreasing cross-section from said outer end to said inner end; and, whereby each said member is compressed between the outer surface of its respective shear pin and the bore of at least one of said ring sectors to form a force transmitting connection therebetween.

2. An improved pressure container as defined in claim 1 wherein said bores are cylindrical.

3. An improved pressure container as defined in claim 1 wherein said first connecting members each comprise a tubular sleeve-like member having an inner cylindrical surface in engagement with the outer surface of its respective shear pin and an outer surface which tapers axially from said outer end to said inner end.

4. An improved pressure container as defined in claim 3 including second connecting members positioned in said clearance passageways between said outer surfaces of said first connecting members and their respective bores.

5. An improved pressure container as defined in claim 4 wherein said bores are cylindrical and wherein said second connecting members comprise second tubular sleeve-like members each surrounding a respective one of said first tubular sleeve-like members and having inner surfaces conforming to, and in engagement with, said outer surface of said respective first tubular sleeve-like members.

References Cited
UNITED STATES PATENTS

| | | |
|---|---|---|
| 3,149,374 | 9/1964 | Wagner. |
| 3,278,993 | 10/1966 | Brayman et al. 18—34 |
| 3,332,113 | 7/1967 | Fristot 249—160 XR |

WILLIAM J. STEPHENSON, Primary Examiner

U.S. Cl. X.R.

249—160